US007873912B1

(12) United States Patent
Crim et al.

(10) Patent No.: US 7,873,912 B1
(45) Date of Patent: Jan. 18, 2011

(54) PROCESS AND SYSTEM FOR PROVIDING A REDUCED SET OF FIELDS ASSOCIATED WITH A REPORT LAYOUT

(75) Inventors: Christopher L. Crim, San Jose, CA (US); Stephen Iremonger, Mountain View, CA (US); John Welshofer, Palo Alto, CA (US); Kenneth D. Walter, Jr., Fremont, CA (US)

(73) Assignee: Apple Inc., Cupertino, CA (US)

( * ) Notice: Subject to any disclaimer, the term of this patent is extended or adjusted under 35 U.S.C. 154(b) by 924 days.

(21) Appl. No.: 11/067,068

(22) Filed: Feb. 25, 2005

(51) Int. Cl.
*G06F 3/048* (2006.01)
*G06F 3/00* (2006.01)
(52) U.S. Cl. .................. 715/765; 715/762; 715/769; 715/788; 715/828
(58) Field of Classification Search ......... 715/906–908, 715/513, 762, 763, 765, 769, 788, 828; 707/100, 707/104.1
See application file for complete search history.

(56) References Cited

U.S. PATENT DOCUMENTS

| 5,754,939 | A  | * | 5/1998  | Herz et al. ............... 455/3.04 |
| 5,915,001 | A  | * | 6/1999  | Uppaluru ................ 379/88.22 |
| 6,047,327 | A  | * | 4/2000  | Tso et al. ................... 709/232 |
| 6,269,369 | B1 | * | 7/2001  | Robertson ................... 707/10 |
| 6,459,913 | B2 | * | 10/2002 | Cloutier ..................... 455/567 |
| 6,501,832 | B1 | * | 12/2002 | Saylor et al. ............. 379/88.04 |
| 6,613,099 | B2 | * | 9/2003  | Crim ......................... 715/210 |
| 6,728,716 | B1 | * | 4/2004  | Bhattacharya et al. ....... 707/10 |
| 6,813,603 | B1 | * | 11/2004 | Groner et al. .............. 704/235 |
| 6,834,285 | B1 | * | 12/2004 | Boris et al. ............. 707/103 R |
| 6,907,546 | B1 | * | 6/2005  | Haswell et al. .............. 714/38 |
| 6,990,480 | B1 | * | 1/2006  | Burt .............................. 707/1 |
| 7,050,079 | B1 | * | 5/2006  | Estrada et al. ............. 715/760 |
| 7,100,195 | B1 | * | 8/2006  | Underwood .................. 726/2 |
| 7,127,232 | B2 | * | 10/2006 | O'Neil et al. .............. 455/408 |
| 7,133,869 | B2 | * | 11/2006 | Bryan et al. ................... 707/9 |
| 7,143,118 | B2 | * | 11/2006 | Eichstaedt et al. .......... 707/201 |

(Continued)

OTHER PUBLICATIONS

"FileMaker 8 Instant Web Publishing Guide" http://www.filemaker.com/downloads/documentation/fm8_instant_web_publishing.pdf downloaded from Internet Dec. 5, 2006, FileMaker, Inc., Santa Clara, CA, Edition: 01, 2004-2005. 44 pages.

*Primary Examiner*—Weilun Lo
*Assistant Examiner*—Nicholas Augustine
(74) *Attorney, Agent, or Firm*—Beyer Law Group LLP

(57) ABSTRACT

The present invention provides methods and apparatus for presenting fields associated with a report format suitable for displaying data associated with a plurality of fields, the plurality of fields being associated with one or more records. A layout is obtained, the layout being a report format including the plurality of fields. A user selection is received. A first list of fields that are pertinent to the layout (e.g., including the plurality of fields) is presented when the user selection is in a first state. For instance, the first list of fields may include only the fields that are in the layout (e.g., visible to the user). When the user selection is in a second state, a user is presented or provided access to a second list of fields, where the second list of fields includes fields that are not in the layout. The second list of fields may also include the fields that are pertinent to the layout (e.g., those fields in the layout).

21 Claims, 7 Drawing Sheets

U.S. PATENT DOCUMENTS

| | | | | |
|---|---|---|---|---|
| 7,143,339 | B2* | 11/2006 | Weinberg et al. | 715/212 |
| 7,237,002 | B1* | 6/2007 | Estrada et al. | 709/203 |
| 7,421,659 | B2* | 9/2008 | Estrada et al. | 715/751 |
| 7,487,154 | B2* | 2/2009 | Rogers et al. | 707/9 |
| 2002/0042846 | A1* | 4/2002 | Bottan et al. | 709/249 |
| 2002/0065884 | A1* | 5/2002 | Donoho et al. | 709/204 |
| 2002/0087740 | A1* | 7/2002 | Castanho et al. | 709/318 |
| 2002/0090934 | A1* | 7/2002 | Mitchelmore | 455/412 |
| 2002/0169774 | A1* | 11/2002 | Greenbaum et al. | 707/9 |
| 2003/0110262 | A1* | 6/2003 | Hasan et al. | 709/226 |
| 2003/0131073 | A1* | 7/2003 | Lucovsky et al. | 709/219 |
| 2003/0225683 | A1* | 12/2003 | Hill et al. | 705/37 |
| 2004/0002972 | A1* | 1/2004 | Pather et al. | 707/6 |
| 2005/0027741 | A1* | 2/2005 | Eichstaedt et al. | 707/104.1 |
| 2005/0144182 | A1* | 6/2005 | Boris et al. | 707/100 |
| 2005/0144266 | A1* | 6/2005 | Antonelli et al. | 709/223 |

* cited by examiner

Customer table
    Customer number
    Customer name
    Customer address
    Customer phone
    Credit card info.
    Invoice number
    Invoice date Invoice line items table
    Invoice number
    1) Product number
    2) # of product number
    ...
    Total invoice amount Product table
    Product number
    Product name
    Product price

PROCESS AND SYSTEM FOR PROVIDING A REDUCED SET OF FIELDS ASSOCIATED WITH A REPORT LAYOUT

BACKGROUND OF THE INVENTION

1. Field of the Invention

The present invention relates generally to databases, and more particularly, to identifying and presenting fields from databases.

2. Description of the Related Art

Early database software programs were a great relief for people who needed to organize and store vast amounts of data. Thus, databases allowed people to input and store information in a form that could be easily re-called and updated. As is well known in the art, database programs have gained tremendous acceptance and usage by families and students, as well as in business settings. By way of example, families have used database programs to keep medical records, keep a budget, maintain an inventory of assets, and compile wedding plan information. Similarly, students may use a database program to maintain student loan records, prioritize class events, and coordinate field trips.

Generally, database programs have gained increased acceptance by the computing public with the advent of more user-friendly database programs, which have made data entry more efficient. Although there have been great improvements in data entry, there is still a great need for database programs that reduce the hassles associated with viewing the data in various formats. By way of example, it may be desirable to view all data associated with a single record. As another example, it may be desirable to compare selected data associated with multiple records. Thus, each time a user wishes to view data in a different format, it is necessary to create a new "report template." As a result, this typically requires repetitively entering frequently viewed fields from scratch each time the information is needed for a particular report template.

In operation, when a database designer wants to define fields for a particular database, a form layout window can be used. FIG. 1 shows a screen shot illustrating an exemplary form layout window used to define fields for a database. In this example, an optional header, "Golf Money Winners" 102, is created and a number of fields 104 are defined to create a body 103. As shown, a last name field 106, a first name field 108, an events field 110, and a total prize money field 112 are defined in the body 103 of the form layout window. Although the form layout may include a footer, a footer is not included in this example.

Once data has been entered and stored in the database, it is often desirable to view the data for a particular record. In the simplest case, the data may be viewed in the format in which it has been entered. Thus, the form layout window is suitable for obtaining (i.e., entering) data for a particular record as well as for displaying data associated with a single database record. FIG. 2 illustrates a screen shot illustrating an exemplary form view window having a number of fields used to view a single record. As shown, the form view window displays fields for a single record. For example, the header 102 and the body 103, which includes the last name field 106, "Sutton", first name field 108, "Hal", events field 110, "30", and total prize money field 112, "$1,838,740", are displayed for a single record. Thus, the form view window includes a body defining a plurality of fields, which have a specified order as well as associated attributes. For example, attributes such as degree of rotation, color, and font may be associated with each field. In addition, each of the attributes has a corresponding attribute value. For instance, an attribute such as the font may be specified by values such as Times New Roman. In addition, the order as specified in this example requires that the last name of each of the golf money winners be displayed as the first field of the body 103. Although the form view format provides a simple mechanism to view a single database record, it is often desirable to view and compare multiple database records. For this purpose, the form view report format is inadequate.

Rather than viewing a single record, multiple records are often simultaneously displayed. FIG. 3 is a screen shot illustrating an exemplary list view window used to view multiple records. In addition to the title 102, "Golf Money Winners," the bodies of multiple records as entered in the main form layout and displayed in the form view format are displayed consecutively. As shown, the body of a first record 302 is shown to include the last name field 304, "Woods", the first name field 306, "Tiger", the Events field 308, "20", and the total prize money field 310, "$1,841,117". Similarly, the body of a second record 312 is shown to include the last name field 314, "Sutton," the first name field 316, "Hal," the events field 318, "30", and the total prize money field 320, $1,838,740. Although multiple records are displayed, it may be desirable to compare field values of multiple records. For instance, a viewer may wish to compare the total prize money won by multiple golf players. However, each of the records is displayed such that the fields associated with a single one of the records are displayed in multiple rows as well as columns. Moreover, since the records are displayed consecutively in the list view format, the values associated with the same field of multiple records are not displayed adjacent to one another and only a few records at most can be concurrently displayed. As a result, it is difficult to make such a simple comparison between values of the same field. From this list view window, it is difficult to make such a determination. Accordingly, although multiple records may be simultaneously displayed in this manner, the list view format does not facilitate comparisons of fields of multiple records.

As described above, it is difficult to compare fields of multiple records using a form view or a list view format. Moreover, it is often desirable to display the same data in a variety of formats. For instance, it may be desirable to vary the format (e.g., appearance) of the fields (e.g., font, column width) as well as the order of the fields. In addition, it may be desirable to alter the manner in which each field is displayed through the association of various attributes such as color, font, or degree of rotation.

It is often desirable to display records in a manner suitable for comparing the values of fields of those records. In order to assist a user in creating such a report, database records may be displayed in a format such as a table format (e.g., using formatting information from an existing layout). One method of presenting database records in a table format is disclosed in U.S. Pat. No. 6,613,099, entitled "Process and System for Providing a Table View of a Form Layout for a Database," listing Christopher Crim as inventor, which is incorporated herein by reference for all purposes.

Referring now to FIG. 4, a screen shot illustrating an exemplary table view window in which various fields from the form layout may be displayed for one or more records of a database is presented. As shown, the table view window is capable of displaying multiple records 401 such that values associated with the same field of the plurality of records are displayed adjacent to one another. For instance, column header 402 identifies the last name field and the corresponding column includes a column of last names such that the last names associated with the records 401 are displayed adjacent to one another. In this example, the values are displayed in a single column. However, values may similarly be displayed in a single row to facilitate comparison of the values. Values associated with column header 404 identifying the first name field, column header 406 identifying the events field, and column header 408 identifying the total prize money field are similarly displayed for the records 401.

Regardless of the layout that is used to present database fields, it is often difficult for a user to select from fields in a particular database. For instance, a user may wish to select fields for sorting purposes. Unfortunately, in order to select these fields, the user must typically navigate and interact with the database. For instance, the user must be able to select a database table from numerous database tables in order to select fields from this database table. However, since the database design is set up by a database designer, the user is typically not familiar with the database design. As a result, the user must typically navigate the database to select the desired fields. Unfortunately, since the user is unfamiliar with the database and associated tables, this field selection process is a tedious and time-consuming process.

In view of the foregoing, what is needed is a process and system for enabling a user to select fields from a database. Moreover, it would be desirable if the fields could be selected by a user while minimizing the efforts required by the user.

SUMMARY OF THE INVENTION

The present invention relates to a process and system for presenting fields for selection by a user. This is accomplished, in part, through enabling the user to select from a set of fields that are pertinent to the layout (i.e., report format) presented. In this manner, the present invention enables a user to easily select fields from a database without requiring the user to navigate the entire database.

The invention can be implemented in numerous ways, including as a process, an apparatus, a system, a device, a method, or a computer readable medium. Several embodiments of the invention are discussed below.

In accordance with one aspect of the invention, methods and apparatus for presenting fields associated with a report format suitable for displaying data associated with a plurality of fields for one or more records are disclosed. A layout is obtained, the layout being a report format including the plurality of fields. For instance, the layout may be a current layout visible to a user, or may be a layout that has been selected by the user. A selection is received from the user. A first list of fields including the plurality of fields is presented when the user selection is in a first state (e.g., when the user selects a "limited" list of fields). The first list of fields may include only those fields that are pertinent to (e.g., used on) the layout. In some embodiments, the first list of fields may be filtered to include only those fields in the layout that are visible, at least in part, to the user. Alternatively, a second list of fields is presented or provided access to when the user selection is in a second state (e.g., when the user selects an "unlimited" list of fields), where the second list of fields includes fields that are not in the layout. The user may then toggle between these two selections.

In accordance with another aspect of the invention, methods and apparatus for presenting fields associated with a report format suitable for displaying data associated with a plurality of fields for one or more records are disclosed, where the records are associated with one or more tables. A layout is obtained, the layout being a report format including the plurality of fields. For instance, the layout may be a layout that is visible to a user, or may be a layout that has been selected by the user. A user selection is received from the user. A first list of fields that are pertinent to the layout is presented when the user selection is in a first state, the first list of fields including the plurality of fields. Alternatively, a second list of fields is presented or provided access to when the user selection is in a second state, the second list of fields including fields that are not pertinent to the layout. The user may then toggle between the two lists of fields.

In accordance with one embodiment, when a list of fields is presented to the user, the associated table name is also presented to the user. In this manner, the user may navigate the tables in a database, or portion thereof. The user may then select one or more fields for use in one or more operations. For instance, the operations may include sorting, exporting in association with one or more records, or performing calculations with the data associated with the selected fields or generating a formula with the selected fields.

In accordance with another embodiment, it may be desirable to enable the user to select from only those fields that the user is permitted to access. Thus, the fields that are presented to the user may be limited to those fields to which the user has read access.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As will be described with reference to the following figures, the present invention enables fields in a particular layout to be automatically presented to the user. Thus, through the present invention, a user may easily identify and select from fields that are present in a particular layout by selecting one option. The fields present in a particular layout may be filtered to include only those fields that are at least partially visible to the user and/or fields to which the user has read access. Alternatively, the user may select from other fields (e.g., by table) by selecting another option.

Figure 1:
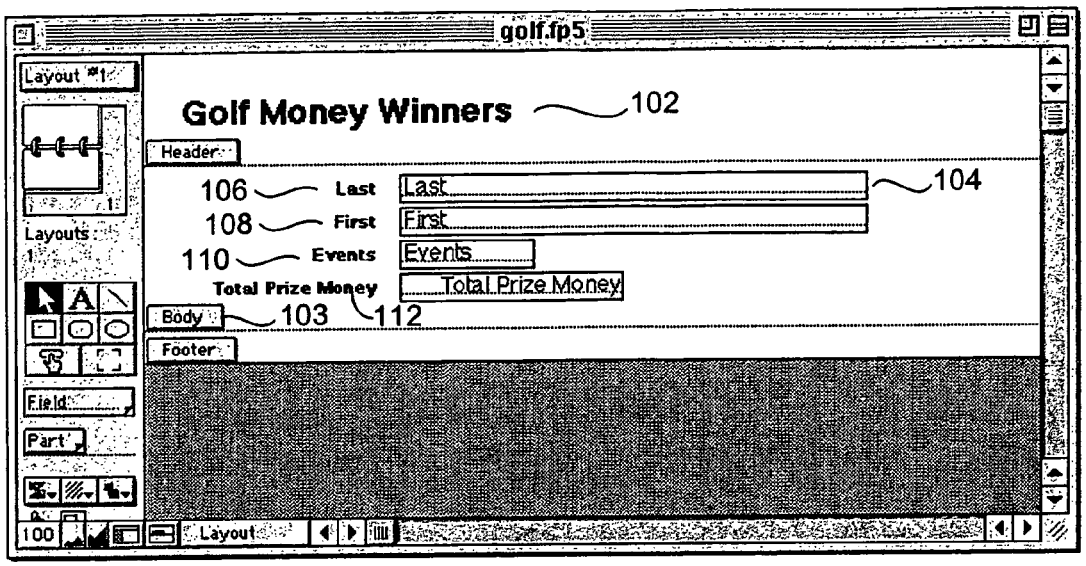
FIG. 1 is a screen shot illustrating an exemplary form layout window used to define fields for a database.
Figure 2:
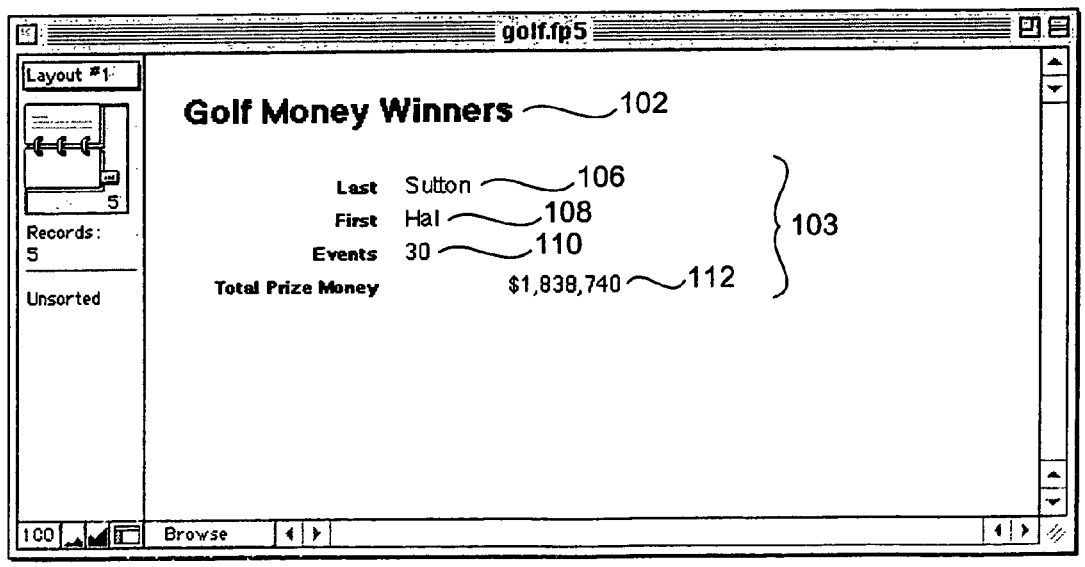
FIG. 2 is a screen shot illustrating an exemplary form view window having a number of fields used to view a database.
Figure 3:
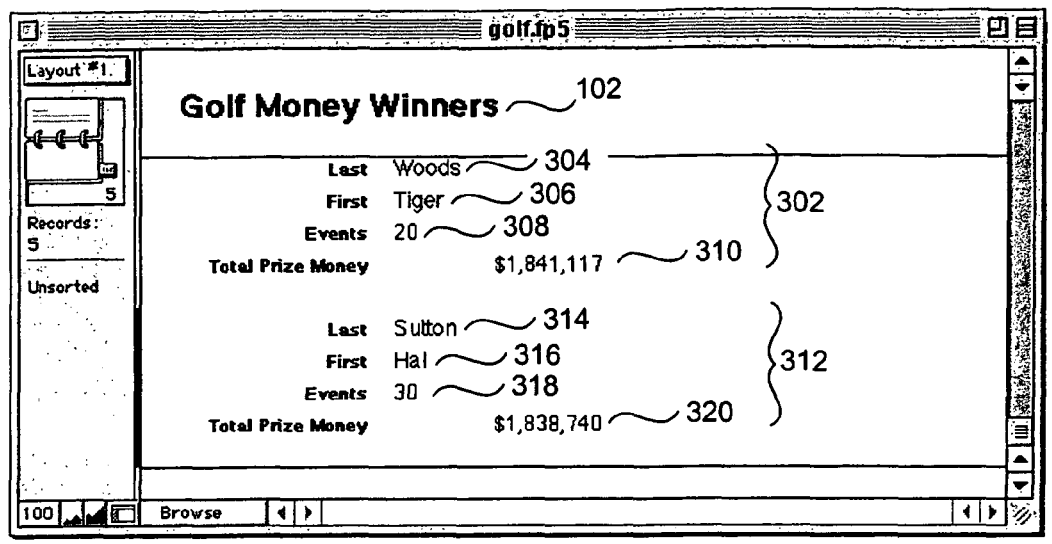
FIG. 3 is a screen shot illustrating an exemplary list view window used to view one or more records in a database.
Figure 4:
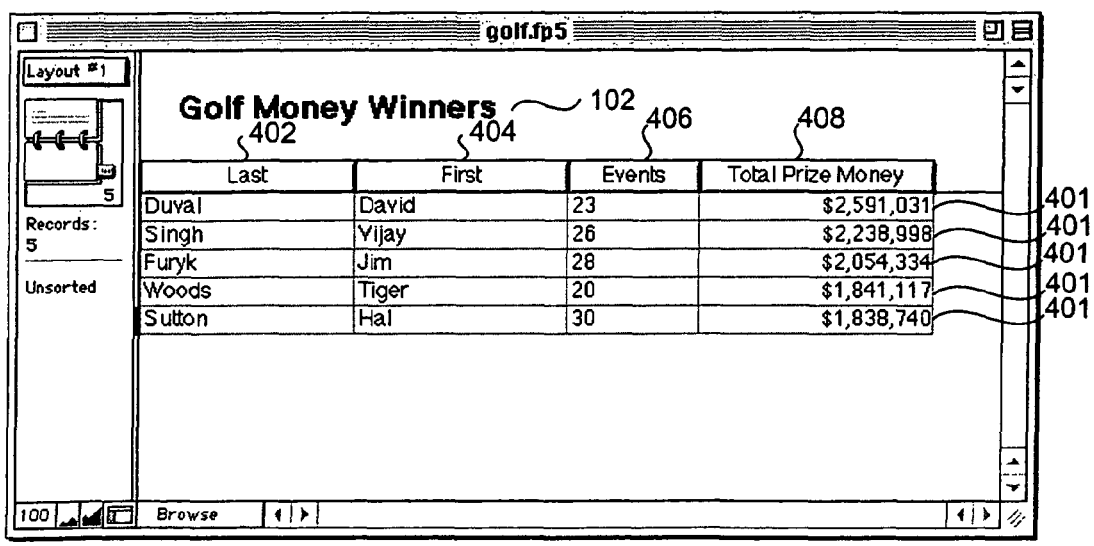
FIG. 4 is a screen shot illustrating an exemplary table view window in which various fields from the form layout are displayed for one or more records in the database.
Figure 5:
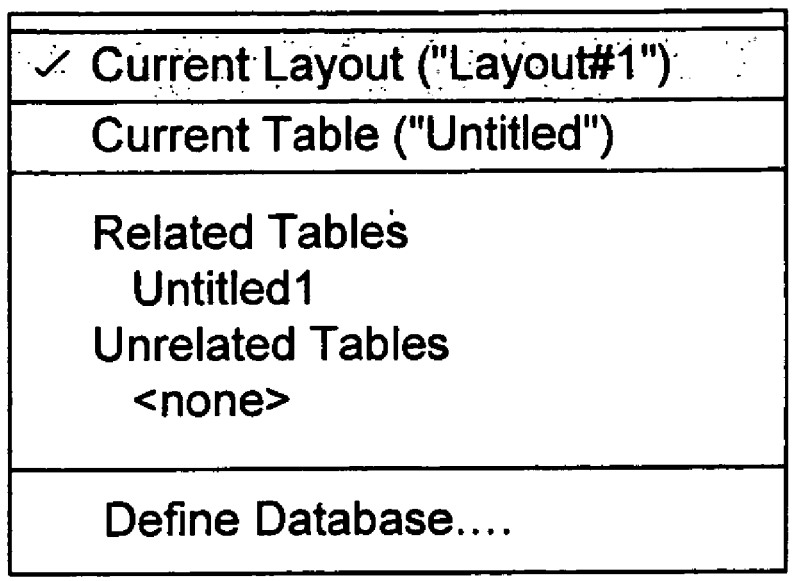
FIG. 5 is an exemplary screen shot enabling a user to select a layout.

In order to identify fields of a layout, a layout or report may be selected by a user. FIG. 5 is an exemplary screen shot enabling a user to select a layout. In this example, the user selects the current layout. From selecting the layout, the user may then be presented with those fields that are associated with the layout (e.g., those fields in the layout). The fields in the layout that are ultimately presented to the user may be filtered to include only those fields that are at least partially visible to the user and/or those fields to which the user has read access. This set of (filtered or unfiltered) fields may be referred to as a "limited" set of fields. The user may also wish to select from fields that are not pertinent to the layout (e.g., an "unlimited" set of fields). This selection may be obtained via a menu or other user interface.

Figure 6:
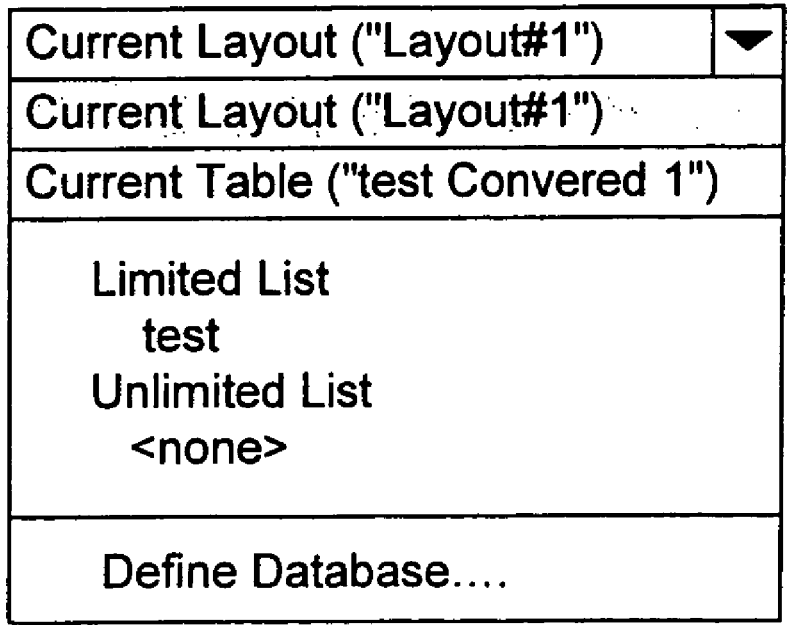
FIG. 6 is an exemplary menu enabling a user to select or toggle between a limited list of fields or an unlimited list of fields.

FIG. 6 is an exemplary menu enabling a user to select or toggle between a limited list of fields and an unlimited list of fields. As shown in FIG. 6, a user may select the "limited" list of fields option or the "unlimited" list of fields option. The user may then toggle between these two options. When the user selects the "limited" list of fields option, a first set of fields may be presented to the user from which the user may select one or more fields. Alternatively, when the user selects the "unlimited" list of fields option, a second set of fields (and associated tables) may be presented to the user from which the user may select one or more fields.

In accordance with various embodiments of the invention, the user may select a limited or unlimited list of fields from a menu such as that presented in FIG. 6. Once the user selects one of the lists of fields, the user may toggle between the lists of fields. Thus, the user may choose to select the limited list of fields when interested in only a small number of fields such as those that are present (e.g., visible) in the current layout, or may choose to select from an unlimited list of fields when the user is interested in fields such as those that are not present (e.g., not visible) in the current layout.

When a list of fields is presented to the user, the list of fields may be filtered to include only those fields that the user is permitted to access or authorized to view and/or those fields that are at least partially visible to the user. For instance, if the user does not have read access to the field and its data, the field may not be presented to the user. The user may then select fields from the fields presented to the user.

Upon the selection of one or more fields, the user may use the fields selected for a variety of purposes. For instance, the fields that have been selected may be used to sort records presented to the user via a layout such as a table layout. Moreover, the selected fields may be exported (e.g., in a specified order), or used in various calculations or formulas.

Figure 7:
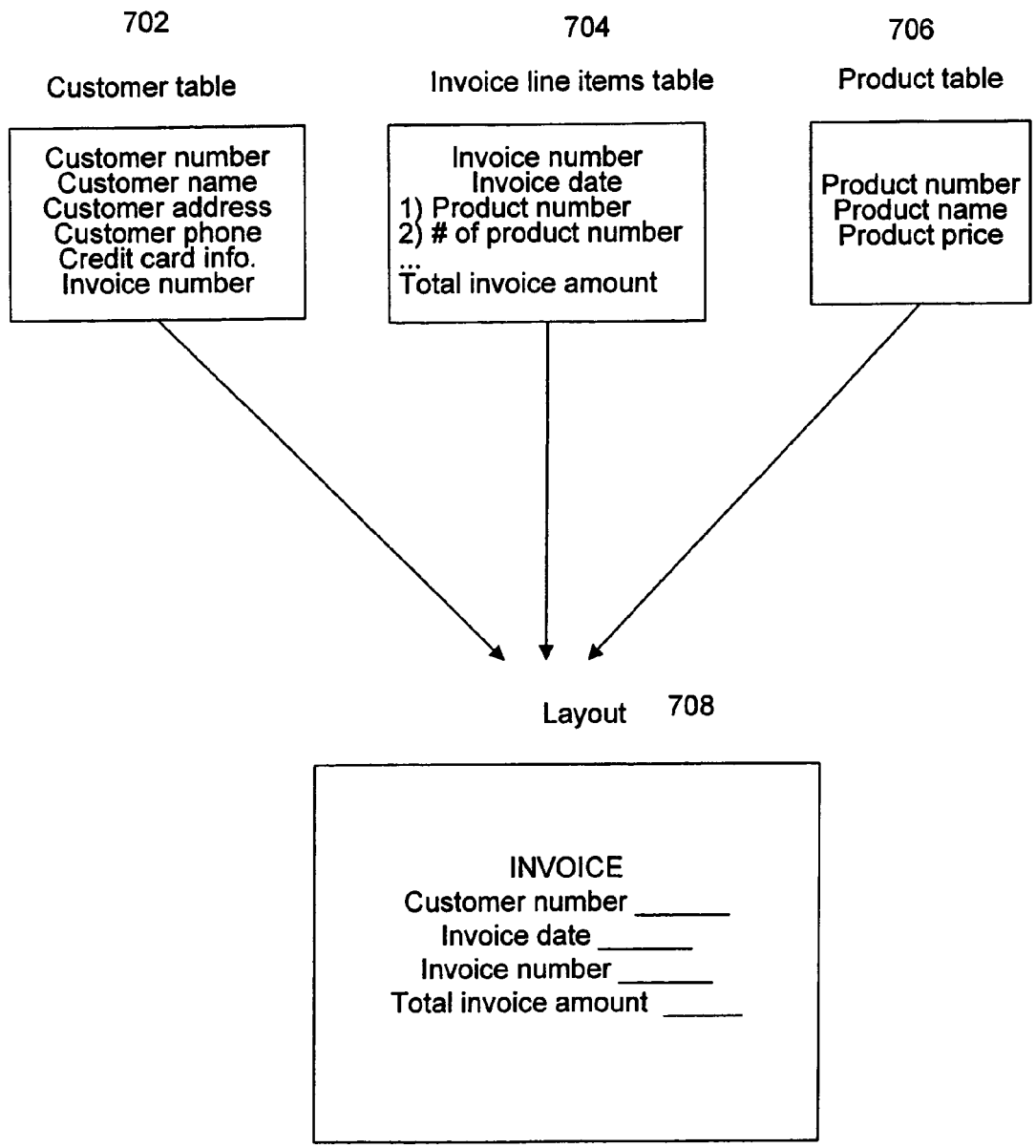
FIG. 7 is a diagram illustrating tables associated with a particular layout.

The disclosed embodiments may be used in association with any layout and with any database design. FIG. 7 is a diagram illustrating an exemplary set of tables associated with a particular layout. In this example, the set of tables includes a customer table 702, an invoice line items table 704, and a product table 706 that are associated with layout 708. In this example, the layout 708 includes fields customer number, invoice date, invoice number, and total invoice amount. The customer table 702 includes fields "Customer number," "Customer name," "Customer address," "Customer phone," "Credit card info.," and "Invoice number." However, the only fields from the customer table 702 that are present (e.g., visible) in the layout 708 are the customer number and invoice number. Similarly, the invoice line items table 704 includes fields "Invoice number," "Invoice date," "Product number," "Number of product number ordered," and "Total Invoice Amount." The only fields from the invoice line items table 704 that are present (e.g., visible) in the layout 708 are the invoice number, invoice date, total invoice amount. The product table 706 includes fields Product number, Product name, and Product Price. Although the product price for each product number ordered is used to calculate the total invoice amount, none of the fields in the product table 706 are present (e.g., visible) in the layout 708.

Typically, when a user selects fields, the user must navigate all tables and fields in a particular database. Even if only a small number of fields are relevant to the user at a given moment in time, the user is faced with selecting from numerous fields. This is particularly tedious if the user is unfamiliar with the database design.

Figures 8, 9:
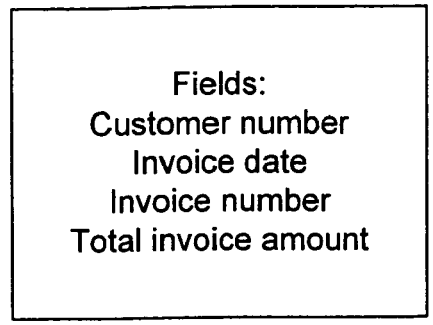
FIG. 8 is a diagram illustrating a limited list of fields presented upon selection of the limited list of fields from the menu of FIG. 6.
FIG. 9 is a diagram illustrating a list of tables and associated fields provided upon selection of the unlimited list of fields from the menu of FIG. 6.

In accordance with various embodiments of the invention, a "limited" list of fields may be presented to the user upon selection of the "limited" list of fields option via a user interface. FIG. 8 is a diagram illustrating a limited list of fields presented upon selection of the limited list of fields from the menu of FIG. 6. In accordance with one embodiment, the limited list of fields includes only those fields that are at least partially visible to the user in the selected (or current) layout (and/or those fields to which the user has read access). Of course, in other embodiments, the limited list of fields may also include other fields that are pertinent to the layout, such as those that are not visible to the user. Thus, in this example, the limited list of fields presented to the user includes the customer number, invoice number, invoice date, and total invoice amount, as presented to the user in the layout described above with reference to FIG. 7.

Of course, the user may also wish to select from fields that are not present in a particular layout. For instance, the user may wish to sort according to information that is not visible in a particular layout. FIG. 9 is a diagram illustrating a list of tables and associated fields provided upon selection of the unlimited list of fields from the menu of FIG. 6. In accordance with one embodiment, the unlimited list of fields is presented in the form of tables and associated fields. In other words, the user may traverse the database hierarchy to select a table. Once a table has been selected, the user may select from fields in that table. Thus, the user may select fields from the customer table, the invoice line items table, and the product table presented above with reference to FIG. 7.

Figure 10:
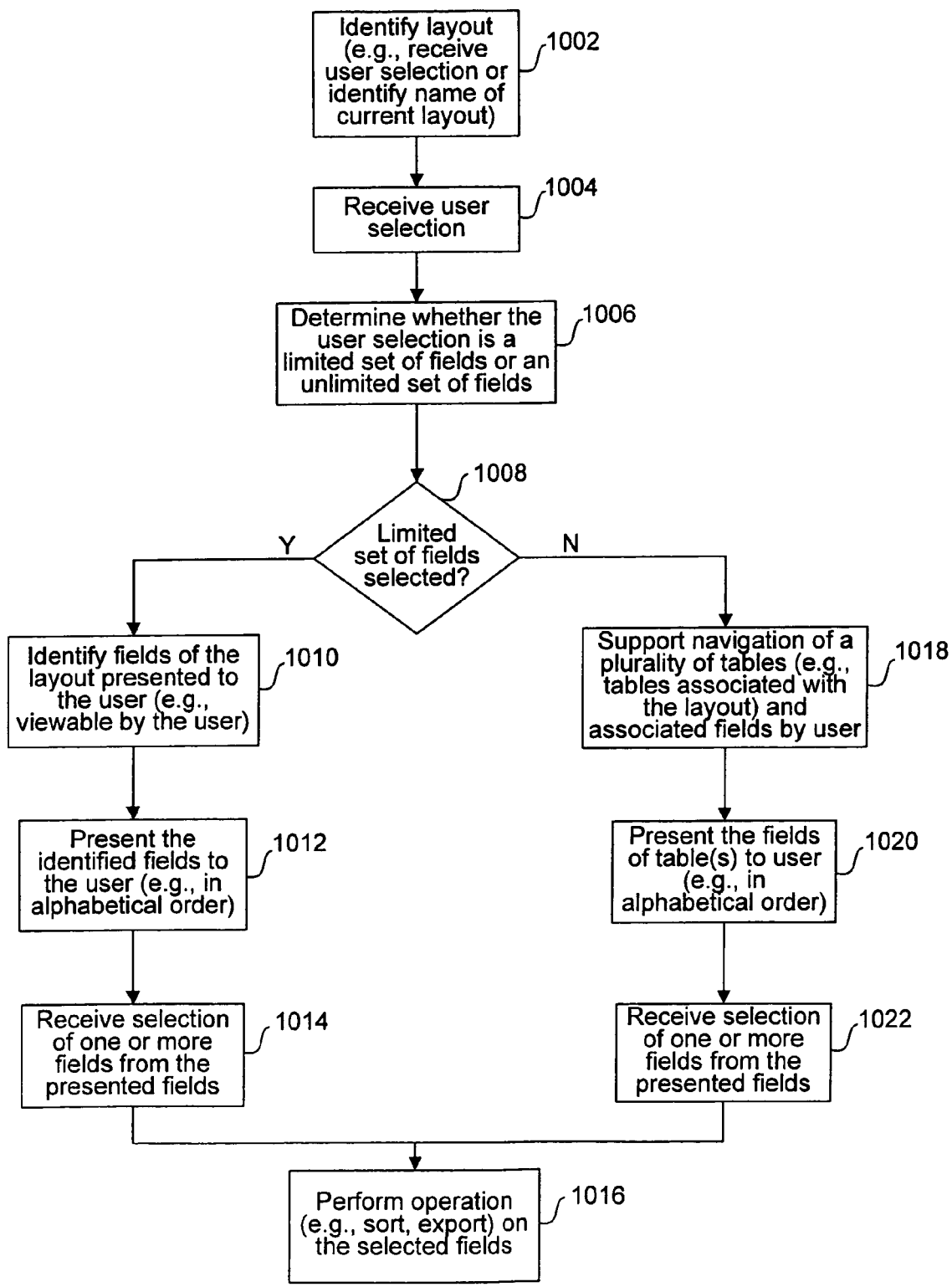
FIG. 10 is a process flow diagram illustrating a method of presenting a limited or an unlimited list of fields in response to a user menu selection in accordance with one embodiment of the invention.

FIG. 10 is a process flow diagram illustrating a method of presenting a limited or an unlimited list of fields in response to a user menu selection in accordance with one embodiment of the invention. The layout is first identified at block 1002. The layout may, for example, be identified via user selection or through identification of the name of the current layout. When a user selection is received at block 1004, it is determined whether the user has selected a limited or unlimited set of fields at block 1006.

If the user has selected a limited set of fields as shown at block 1008, the fields of the layout (e.g., viewable by the user) that are presented to the user are identified at block 1010. The identified fields are then presented to the user at block 1012. For instance, the identified fields may be presented to the user in alphabetical order. One or more of the presented fields may then be selected by the user at block 1014.

Once the selection of one or more fields has been received from the user, an operation may be performed on the selected fields at block 1016. For instance, the selected fields may be exported or sorted, as specified by the user.

If the user has selected an unlimited set of fields as shown at block 1008, the user may select fields from all fields in a particular database. In other words, the unlimited list of fields includes fields that are not pertinent to the layout (e.g., those fields that are not present in the layout or not viewable by the user in the layout). In accordance with one embodiment, the user may navigate a plurality of tables and associated fields in a database at block 1018. The tables may be all tables in the database or, alternatively, the tables may be those tables that are associated with a particular layout (e.g., tables that are pertinent to the layout, but include fields that are not present in the layout or not visible to the user). The fields are then presented to the user at block 1020. The fields may therefore include all fields in a particular database, and may also include fields that are not visible in a particular layout. For instance, the identified fields may be presented to the user in alphabetical order and/or may be presented along with the name of the corresponding table. One or more of the presented fields may then be selected by the user at block 1022. For instance, the user may navigate the database by selecting one of the tables. Upon selection of one of the tables, the user may select one or more associated fields. In this manner, the user may select fields associated with one or more of the tables.

As set forth above, once the user has selected a set of fields, one or more operations may be performed on the selected fields at block 1016. The user may select a particular operation, such as an export or sort operation, to be performed. The selected operation is then performed on the selected fields.

As set forth above, the "limited" set of fields includes fields that are pertinent to the layout. Thus, these fields may include only those fields that are in the layout, which may be filtered to include only those that are at least partially visible to the user. Alternatively, the fields that are considered pertinent to the layout may include all fields of tables that are pertinent to the layout (e.g., including those fields that are not visible to the user).

Moreover, the "unlimited" set of fields includes fields that are not pertinent to the layout. However, the unlimited set of fields preferably includes those fields that are pertinent to the layout as well. For instance, the unlimited set of fields preferably includes the fields of the layout (e.g., those that are visible to the user).

The above-described embodiments enable a user to select fields from either a limited set of fields or an unlimited set of fields. Moreover, the user may toggle between the two different options. Through the selection of a limited set of fields, the visual clutter may be reduced.

The invention employs various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. An exemplary structure for the invention is described below.

Figure 11:
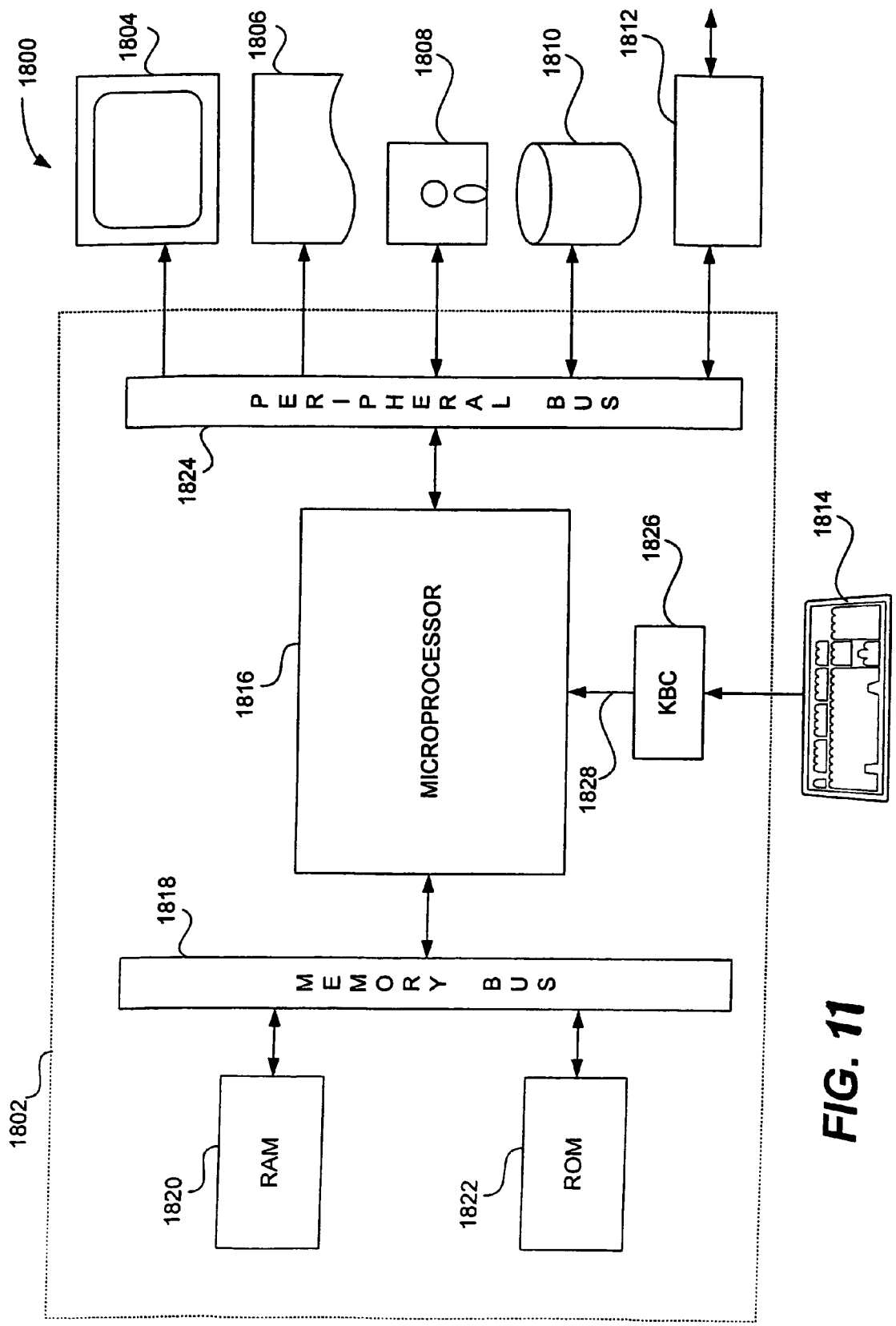
FIG. 11 is a block diagram of an exemplary computer system for carrying out the processing according to the invention.

FIG. 11 is a block diagram of an exemplary computer system 1800 for carrying out the processing according to the invention. The computer system 1800 includes a digital computer 1802, a display screen (or monitor) 1804, a printer 1806, a floppy disk drive 1808, a hard disk drive 1810, a network interface 1812, and a keyboard 1814. The digital computer 1802 includes a microprocessor 1816, a memory bus 1818, random access memory (RAM) 1820, read only memory (ROM) 1822, a peripheral bus 1824, and a keyboard controller 1826. The digital computer 1800 can be a personal computer or some other type of computer.

The microprocessor 1816 is a general purpose digital processor which controls the operation of the computer system 1800. The microprocessor 1816 can be a single-chip processor or can be implemented with multiple components. Using instructions retrieved from memory, the microprocessor 1816 controls the reception and manipulation of input data and the output and display of data on output devices. According to the invention, a particular function of microprocessor 1816 is to assist in the operation of a database program supporting, among other things, table layouts The memory bus 1818 is used by the microprocessor 1816 to access the RAM 1820 and the ROM 1822. The RAM 1820 is used by the microprocessor 1816 as a general storage area and as scratch-pad memory, and can also be used to store input data and processed data. The ROM 1822 can be used to store instructions or program code followed by the microprocessor 1816 as well as other data.

The peripheral bus 1824 is used to access the input, output, and storage devices used by the digital computer 1802. In the described embodiment, these devices include the display screen 1804, the printer device 1806, the floppy disk drive 1808, the hard disk drive 1810, and the network interface 1812. The keyboard controller 1826 is used to receive input from keyboard 1814 and send decoded symbols for each pressed key to microprocessor 1816 over bus 1828.

The display screen 1804 is an output device that displays images of data provided by the microprocessor 1816 via the peripheral bus 1824 or provided by other components in the computer system 1800. The printer device 1806 when operating as a printer provides an image on a sheet of paper or a similar surface. Other output devices such as a plotter, typesetter, etc. can be used in place of, or in addition to, the printer device 1806.

The floppy disk drive 1808 and the hard disk drive 1810 can be used to store various types of data. The floppy disk drive 1808 facilitates transporting such data to other computer systems, and hard disk drive 1810 permits fast access to large amounts of stored data.

The microprocessor 1816 together with an operating system operate to execute computer code and produce and use data. The computer code and data may reside on the RAM 1820, the ROM 1822, or the hard disk drive 1820. The computer code and data could also reside on a removable program medium and loaded or installed onto the computer system 1800 when needed. Removable program mediums include, for example, CD-ROM, PC-CARD, floppy disk and magnetic tape.

The network interface 1812 is used to send and receive data over a network connected to other computer systems. An interface card or similar device and appropriate software implemented by the microprocessor 1816 can be used to connect the computer system 1800 to an existing network and transfer data according to standard protocols.

The keyboard 1814 is used by a user to input commands and other instructions to the computer system 1800. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data, which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. For instance, the "limited" set of fields may consist of fields that are pertinent to a particular layout, which may include only those fields that are visible to the user or all fields in a particular layout. Of course, the "limited" set of fields and "unlimited" set of fields may be implemented in a variety of ways. Broadly speaking, the operations described above may be used to present and select from fields of databases stored in a number of mediums. By way of example, the databases may be stored on a disk drive, a hard drive, a floppy disk, a server computer, a remotely networked computer, etc. Moreover, although the present invention refers to the generation of layouts or reports from a single database, reports may be generated using data from multiple databases as well as alternate sources. Accordingly, the present embodiments are to be considered as illustrative and not restrictive, and the invention is not to be limited to the details given herein, but may be modified within the scope and equivalents of the appended claims.

What is claimed is:

1. A computer-implemented method of presenting data of a database, the computer-implemented method comprising:
    receiving a user request for a data layout for data from a database having a set of data tables and associated data fields;
    presenting to the user an option for selecting that the requested data layout is a limited data layout or an unlimited data layout, wherein the data fields in the limited data layout are limited to the data fields included in a proper subset of the set of all data fields in the database;
    receiving a selection indicating whether the data layout is the limited data layout or the unlimited data layout;
    if the selection indicates that the data layout is the limited data layout, then identifying the proper subset of data fields, presenting the identified proper subset of data fields to the user, and receiving a selection of one or more of the presented data fields from the user;
    if the selection indicates that the data layout is the unlimited data layout, then providing navigation support of a plurality of data tables and associated data fields to the user wherein at least one of the plurality of data tables is not related to the layout, presenting the plurality of tables and associated data fields to the user, and receiving a user selection of the one or more data fields; and
    performing an operation on the selected one or more data fields, wherein the operation is the same regardless of whether the one or more data fields was selected from the limited data layout or the unlimited data layout; and
    presenting a report based on results of the operation on the selected one or more data fields.

2. The method of claim 1, wherein the proper subset of data fields consists of fields that are at least partially visible to the user.

3. The method of claim 1, wherein the presenting the plurality of tables and associated data fields further includes presenting the data fields in alphabetical order.

4. The method of claim 1, wherein each of the data fields in the proper subset of data fields has associated formatting information.

5. The method of claim 1, wherein the presenting to the user an option includes providing a menu having the limited data layout and unlimited data layout options, from which the user selects.

6. The method of claim 1, wherein the operation is a sort operation.

7. The method of claim 1, wherein the operation is an export operation.

8. The method of claim 7, wherein the export operation is performed such that a selected one or more data fields are exported in a specified order.

9. The method of claim 1, wherein the operation includes generating a formula including the selected one or more data fields.

10. A computer-implemented method of presenting data of a database, the computer-implemented method comprising:
    identifying a data layout for data from a database having a set of data tables and associated data fields;
    causing the display to the user of an option for selecting that the requested data layout is a limited data layout or an unlimited data layout, wherein the data fields in the limited data layout are limited to the data fields included in a proper subset of the set of all data fields in the database;
    receiving a selection indicating whether the data layout is the limited data layout or the unlimited data layout;
    if the selection indicates that the data layout is the limited data layout, then identifying the proper subset of data fields, causing the identified proper subset of data fields to be displayed to the user, and receiving a selection of one or more of the presented data fields from the user;
    if the selection indicates that the data layout is the unlimited data layout, then providing navigation support of a plurality of data tables and associated data fields to the user wherein at least one of the plurality of data tables is not related to the layout, causing the plurality of tables and associated data fields to be presented to the user, and receiving a user selection of the one or more data fields; and
    performing an operation on the selected one or more data fields, wherein the operation is the same regardless of whether the one or more data fields was selected from the limited data layout or the unlimited data layout; and
    presenting a report based on results of the operation on the selected one or more data fields.

11. The computer-implemented method of claim 10, wherein the unlimited data layout is a list view layout.

12. The computer-implemented method of claim 10, wherein the option for selecting that the requested data layout is a limited data layout or an unlimited data layout is a toggle menu, wherein a user is able to toggle between limited data layout and unlimited data layout by navigating a cursor to the corresponding toggle location and clicking a button.

13. The computer-implemented method of claim 10, wherein the providing navigation support includes filtering the fields of the database so that fields to which the user does not have read access are not presented to the user.

14. The computer-implemented method of claim 10, wherein the data layout is identified by user selection.

15. The computer-implemented method of claim 10, wherein the data layout is identified by using the name of a current layout.

16. A computer system comprising:
   a database;
   a database engine including a processor configured to:
   identify a data layout for data from a database having a set data tables and associated data fields;
   cause the display to the user of an option for selecting that the requested data layout is a limited data layout or an unlimited data layout, wherein the data fields in the limited data layout are limited to the data fields included in a proper subset of the set of all data fields in the database;
   receive a selection indicating whether the data layout is the limited data layout or the unlimited data layout;
   if the selection indicates that the data layout is the limited data layout, then identify the proper subset of data fields, causing the identified proper subset of data fields to be displayed to the user, and receiving a selection of one or more of the presented data fields from the user;
   if the selection indicates that the data layout is the unlimited data layout, then provide navigation support of a plurality of data tables and associated data fields to the user wherein at least one of the plurality of data tables is not related to the layout, causing the plurality of tables and associated data fields to be presented to the user, and receiving a user selection of the one or more data fields; and
   perform an operation on the selected one or more data fields, wherein the operation is the same regardless of whether the one or more data fields was selected from the limited data layout or the unlimited data layout; and
   present a report based on results of the operation on the selected one or more data fields.

17. The computer system of claim 16, further comprising:
   a portable computer communicatively coupled via a network to the database engine, wherein the portable computer is configured to receive the user selections and to display the presented data fields to the user.

18. The computer system of claim 17, wherein the portable computer has a display with a size that is limited such that it would be unable to display all of the data fields in the unlimited data layout without scrolling.

19. A database engine comprising:
   means for receiving a user request for a data layout for data from a database having a set data tables and associated data fields;
   means for presenting to the user an option for selecting that the requested data layout is a limited data layout or an unlimited data layout, wherein the data fields in the limited data layout are limited to the data fields included in a proper subset of the set of all data fields in the database;
   means for receiving a selection indicating whether the data layout is the limited data layout or the unlimited data layout;
   means for, if the selection indicates that the data layout is the limited data layout, then identifying the proper subset of data fields, presenting the identified proper subset of data fields to the user, and receiving a selection of one or more of the presented data fields from the user;
   means for, if the selection indicates that the data layout is the unlimited data layout, then providing navigation support of a plurality of data tables and associated data fields to the user wherein at least one of the plurality of data tables is not related to the layout, presenting the plurality of tables and associated data fields to the user, and receiving a user selection of the one or more data fields; and
   means for performing an operation on the selected one or more data fields, wherein the operation is the same regardless of whether the one or more data fields was selected from the limited data layout or the unlimited data layout; and
   means for presenting a report based on results of the operation on the selected one or more data fields.

20. The database engine of claim 19, wherein the unlimited data layout is a list view layout.

21. The database engine of claim 19, wherein the option for selecting that the requested data layout is a limited data layout or an unlimited data layout is a toggle menu, wherein a user is able to toggle between limited data layout and unlimited data layout by navigating a cursor to the corresponding toggle location and clicking a button.

* * * * *

UNITED STATES PATENT AND TRADEMARK OFFICE
CERTIFICATE OF CORRECTION

| | |
|---|---|
| PATENT NO. | : 7,873,912 B1 |
| APPLICATION NO. | : 11/067068 |
| DATED | : January 18, 2011 |
| INVENTOR(S) | : Christopher L. Crim et al. |

It is certified that error appears in the above-identified patent and that said Letters Patent is hereby corrected as shown below:

In column 8, line 25, delete "layouts" and insert -- layouts. --, therefor.

Signed and Sealed this
Twenty-fifth Day of October, 2011

David J. Kappos
*Director of the United States Patent and Trademark Office*